United States Patent [19]

Freiberg et al.

[11] 3,969,688

[45] July 13, 1976

[54] TRAVELING WAVE UNSTABLE RESONATORS FOR RADIAL FLOW LASERS

[75] Inventors: Robert J. Freiberg, South Windsor; George H. McLafferty, Manchester, both of Conn.

[73] Assignee: United Technologies Corporation, Hartford, Conn.

[22] Filed: Apr. 14, 1975

[21] Appl. No.: 568,082

[52] U.S. Cl. ............................ 331/94.5 C; 350/299
[51] Int. Cl.² ............................................. H01S 3/081
[58] Field of Search .................... 331/94.5; 350/299; 356/112

[56] References Cited
UNITED STATES PATENTS

| | | | |
|---|---|---|---|
| 3,824,487 | 7/1974 | Buczek et al. | 331/94.5 |
| 3,873,942 | 3/1975 | Reilly | 331/94.5 |
| 3,909,744 | 9/1975 | Wisner et al. | 331/94.5 |

Primary Examiner—William L. Sikes
Attorney, Agent, or Firm—Anthony J. Criso

[57] ABSTRACT

A radial flow ring laser having an unstable resonator configuration with a traveling wave optical path is disclosed. The gain medium forms a cylindrical sheath which is symmetric about a centerline axis through the resonator and the output beam is circular in cross section. The resonator geometry is based on first and second conical mirrors which are positioned symmetrically on the axis centerline and first and second annular mirrors which are symmetric about the axis and complete the ring path. The resonator description also includes an annular stripper mirror to produce the output beam of radiation and a suppression mirror to prevent a traveling wave in the undesired direction through the ring. An alternate embodiment includes a cylindrical folding mirror to cause the optical path to cross the centerline axis after each pass through the gain medium.

7 Claims, 4 Drawing Figures

TRAVELING WAVE UNSTABLE RESONATORS FOR RADIAL FLOW LASERS

BACKGROUND OF THE INVENTION

1. Field of the Invention

The present invention relates to lasers which provide an output beam having a high power and more particularly to unstable ring resonators.

2. Description of the Prior Art

Laser systems which provide an output beam at a very high power level such as those made possible with combustion driven chemical lasers are subject to various restraints which limit the actual output power from such a system. One of these limitations is due to a phenomenon which is commonly referred to as superfluorescence, a condition under which a gain medium having a population inversion produces spurious beams of laser radiation without an interaction with any reflecting surface. These spurious beams are undesirable because they deplete the population inversion which would otherwise be available for controlled stimulated emission from the working medium. Also these beams can be sufficiently powerful to expose various equipment in the area to damage.

One of the concepts advanced to increase the amount of working medium available without incurring superfluorescence effects is taught by Chenausky et al. in U.S. Pat. No. 3,921,096 entitled Unstable Split Mode Laser Resonator, filed on Dec. 16, 1974 and held with the present application by a common assignee. The essence of the split-mode resonator concept is the use of two separate volumes of gain medium, each of which has dimensions no greater tha the limitations imposed by superfluorescence. The individual volumes have no direct line of sight contact with one another although there is a region of common resonance in which the phase of the beam in each of the regions becomes locked to the phase of the beam from the other region. The invention is primarily for a high gain, short lifetime gaseous working medium which passes through the resonator in what is primarily an axial direction.

An unstable resonator concept having a radial mode pattern is disclosed by Chenausky et al in Application Ser. No. 568,083 entitled Unstable Laser Resonator Having Radial Propagation, filed on even date and held with the present application by a common assignee. The toroidal unstable resonator geometries described therein increase the volume of gain medium which can be accommodated without encountering superfluorescence which was not possible with the split-mode resonator previously described. The direction in which the gain medium flows is again essentially axial.

Another approach to the problem involves arranging the gain medium in the form of a cylindrical sheath such as that produced by radial flow configuration so that a relatively large volume can be handled without exceeding the superfluorescence length limitations. A relatively simple unstable resonator including an annular convex toroidal surface at one end of the cylindrical working medium and an annular concave toroidal mirror at the other end of the cylinder is feasible. The utility of such a resonator configuration is severely limited by the poor optical quality of the laser beam which results therefrom. A conventional unstable resonator arranged in such a cylindrical geometry has a very high Fresnel number which is defined as the square of the outer diameter of the cylindrical sheath of active medium divided by four times the product of the laser wavelength and the length of the cylinders. This high Fresnel number is an indication of very little coupling of the beam phase front around the circumference of the cavity as the laser radiation propagates between the annular end mirrors and through the circumferentially oriented gain medium. As a consequence such a resonator displays very poor mode discrimination and is prone to support high order azimuthal modes which have far field energy distributions exhibiting a minimum on axis and departing significantly from defraction limited operation.

SUMMARY OF THE INVENTION

A primary object of the present invention is to provide a laser beam having both high power and good optical beam quality with an unstable resonator having a working medium in a cylindrical sheath configuration.

According to the present invention an unstable ring resonator is formed having a centerline axis with a gain region in the configuration of a thin wall cylinder and disposed symmetrically about the centerline axis, and a cylindrical gas source region disposed adjacent to and internal of the gain region and symmetric about the centerline axis.

One feature of the present invention is the use of an active gain medium in the shape of a relatively thin wall cylinder with a resonator having a traveling wave optical path. The system optics form an unstable ring resonator and the output beam is annular in cross section. The working medium flows radially outward from the centerline axis of the resonator and provides gain over a radial extent equal to the extraction length. The volume of gain medium is determined by the maximum height of the cylindrical sheath which can be accommodated in the resonator without incurring superfluorescence. Since the volume of the gain medium can be increased by simply increasing the inside diameter of the cylindrical sheath, the volume is essentially unlimited.

One of the primary advantages of the present invention is the high quality of the optical beam which results from the effective discrimination against high order transverse modes provided by a region of common resonance dominated by diffractive cross-coupling. Also even a gain medium having a short decay time can be used to maximum advantage by locating the discharge nozzles along their cylindrical surface adjacent to the inner edge of the cylindricl gain region of the resonator.

The foregoing and other objects, features, and advantages of the present invention will become more apparent in the light of the following detailed description of preferred embodiments thereof as illustrated in the accompanying drawing.

DESCRIPTION OF THE PREFERRED EMBODIMENT

Figure 1:
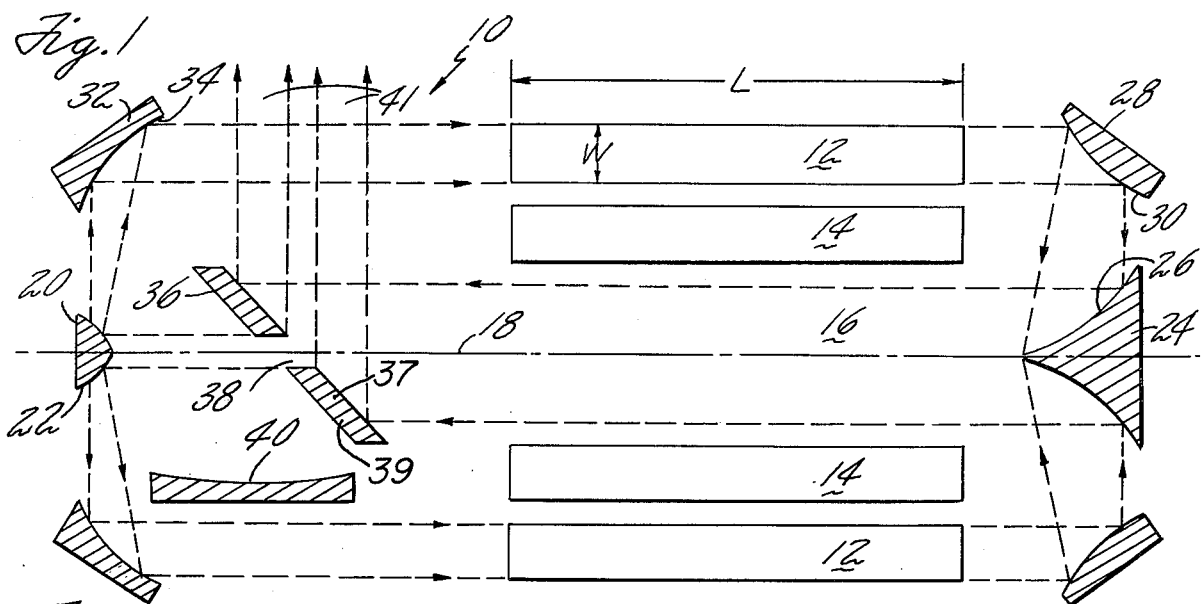
FIG. 1 is a simplified schematic of a cross-sectional view of a ring resonator showing the principal optical elements for radial flow unstable resonator in accordance with the present invention.

The present invention is the traveling wave analogy of the teaching provided by Freiberg et al in Application Ser. No. 568,084 entitled Standing Wave Unstable Resonators for Radial Flow Lasers, filed on even date and held with the present application by a common assignee. A cross-sectional view of an unstable resonator assembly 10 utilizing an active gain region in the shape of a relatively thin wall cylinder is shown in FIG. 1. The resonator is a traveling wave positive branch device. The positional relationship between the gain medium 12 having a radial width W and a length L, a source gas region 14 and a center region 16 is shown with each region being concentrically positioned about a centerline axis 18. The gas source region usually contains a combustor and nozzle means which provide the required supply of suitable inverted working medium to the gain region. The working medium is provided around the entire inner circumference of the gain region and flows through the gain region radially away from the centerline axis 18.

A first axial mirror 20 having a convex reflective surface 22 which is conical and a second axial mirror 24 having a concave reflective surface 26 which is also conical define the center region of the resonator. A first annular folding mirror 28 having a convex reflective surface 30 and a second annular folding mirror 32 having a concave conical reflective surface 34 are positioned symmetrically about the centerline axis 18 and cooperate with the axial mirrors to define the optical path through the resonator. A coupling mirror 36 having a front planar reflective surface 37, a back planar reflective surface 39 and a circular aperture 38 therethrough is positioned symmetrically about the axis. The coupling mirror 36 is convenient but not essential to the resonator operation. The front surface 37 is employed to extract an annular output beam 41 from the resonator. When the annular mirror is not used radiation is coupled out of the resonator around the first axial mirror 20. A suppression mirror 40 in conjunction with the back surface 39 is employed to suppress the undesirable traveling wave which propagates in the undesired direction through the ring resonator. The reflective surface of the mirror 40 can be planar or concave depending upon the wavefront curvature of the wave propagating in the undesired direction. The operation of a radial flow ring laser with an unstable resonator in accordance with the present invention is analogous to the operation of a conventional ring resonator which is known and described for example by Buczek et al. in U.S. Pat. No. 3,824,487 entitled Unstable Ring Laser Resonators, filed on May 8, 1972 and held with the present application by a common assignee.

Merely combining convex and concave end mirrors to form an unstable resonator has been done previously however in the resonator configuration shown in FIG. 1 the first and second annular mirrors are toroidal and in combination with the first and second axial mirrors describe a unique ring resonator in which the optical axis of the resonator undergoes a transformation from the centerline axis 18 to the outer cylindrical surface of the gain region 12. The optical axis is located in the lower gain downstream portion of the gain region to allow the higher gain upstream portions of the working medium which contribute directly to the extracted power in the annular output to be more effectively saturated by the higher intracavity fluxes. Further, locating the optical axis in a region of low intracavity flux minimizes the thermal loading on the axial reflector in the vicinity of its apex which as a practical matter is often slightly rounded. Also when the optical axis is located in this manner, the conical reflector serves to compensate for the intensity gradient of the intracavity beam in region 12 and tends to make the intensity profile more uniform in the center region 18.

Figure 2:
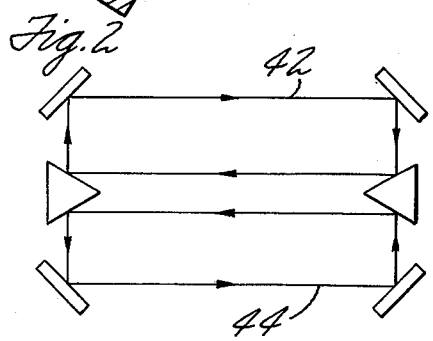
FIG. 2 is a sketch showing the overall optical path through the resonator in FIG. 1.

A simplified sketch of the traveling wave path through the resonator described above is shown in FIG. 2. The traveling wave forms essentially two circular circuits, an upper circuit 42 which travels clockwise and a lower circuit 44 which travels anticlockwise. These two circuits are cross connected in the center region where phase coherence across the entirety of the circulating beam is established.

The intracavity beam in the gain region 12 is collimated and has a width W which is less than one-half the width of the beam in the center region 16 because the beam which exists in the gain region as a thin wall cylinder is transformed and expanded into a beam having a circular cross section in the center region by the first annular and second axial mirrors. The optical axis must be located at the outer cylindrical surface of the gain region 12 to allow the wavefronts of the intracavity beam propagating as a cylindrical sheath in the gain region to combine correctly and in a compatible fashion with the center region 16 of the resonator. The optical quality of the beam in the center region is good as a consequence of the proper transformation of the beam by the expanding mirrors and because the Fresnel number representative of the center region 16 is low enough that effective diffractive cross-coupling of the phase fronts from various portions throughout the cylindrical sheath occur and the beam is locked when the cylindrical beam is transformed into consolidated circular beam around the centerline axis 18.

The operation of many high power laser resonators frequently requires that the optical flux in the gain region of the cavity be as high as possible in order to effectively saturate the gain of the working medium and to effectively extract the available power from the resonator. This is particularly important for regions exhibiting the largest small signal gain such as those near the inside surface of the cylindrical sheath of the gain region. An inability to saturate the extraction process limits the power output from such a resonator to something less than what is otherwise available. As a practical matter, the maximum value of optical flux which can be tolerated in the resonator is usually determined by the capacity of the reflective surfaces of the mirrors. In the resonator assembly shown in FIG. 1 the flux of the circular beam in the center region is much greater than the flux of the annular beam in the gain region. The ratio of flux in the gain region to flux in the center region is given by the ratio of their respective cross-sectional areas. High flux densities in the gain region are desirable since the higher the flux density the greater the amount of power that can be extracted from the gain region.

Another consideration which suggests that the gain in the system be as high as possible is the effect on the optical quality of the output beam due to anomalous dispersion which is a phenomenon denoting the nonlinear departure of the index of refraction of the medium in the vicinity of the center frequency of the lasting transition. Reducing the gain by effectively saturating the working medium by means of high flux density is known to decrease the amount of anomalous dispersion. This effect suggests that the flux be as high as possible in the gain region 12. Since the maximum flux is limited by the reflective surfaces forming a resonator in accordance with the present invention, and the highest flux occurs in the circular center region shown in FIG. 1, the flux in the annular region of the resonator is lower than it might be otherwise. This observation triggered the evolution of resonator geometries in which the flux on the most heavily loaded reflective surfaces is decreased. The first and second annular folding mirrors are shown in FIG. 1 with convex and concave reflective surfaces respectively. From a strictly theoretical consideration either of these mirrors could be flat however curvature of the first annular mirror 28 in conjunction with the concave conical mirror 24 provides an intracavity expansion of the beam prior to the annular coupler 36 whereas curvature of the second annular mirror 32 in conjunction with the convex conical mirror 20 provides an intracavity expansion of the beam passing through the annular coupler such that it effectively fills the cylindrical sheath of active medium 12.

Figure 4:
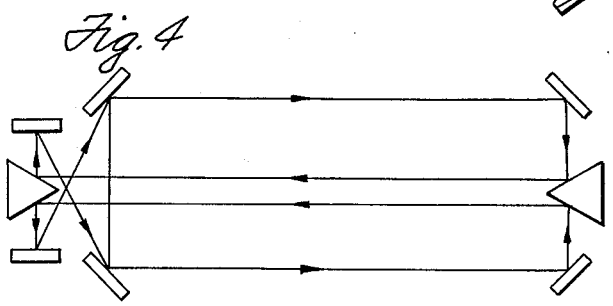
FIG. 4 is a sketch showing the overall optical path through the resonator shown in FIG. 3.
Figure 3:
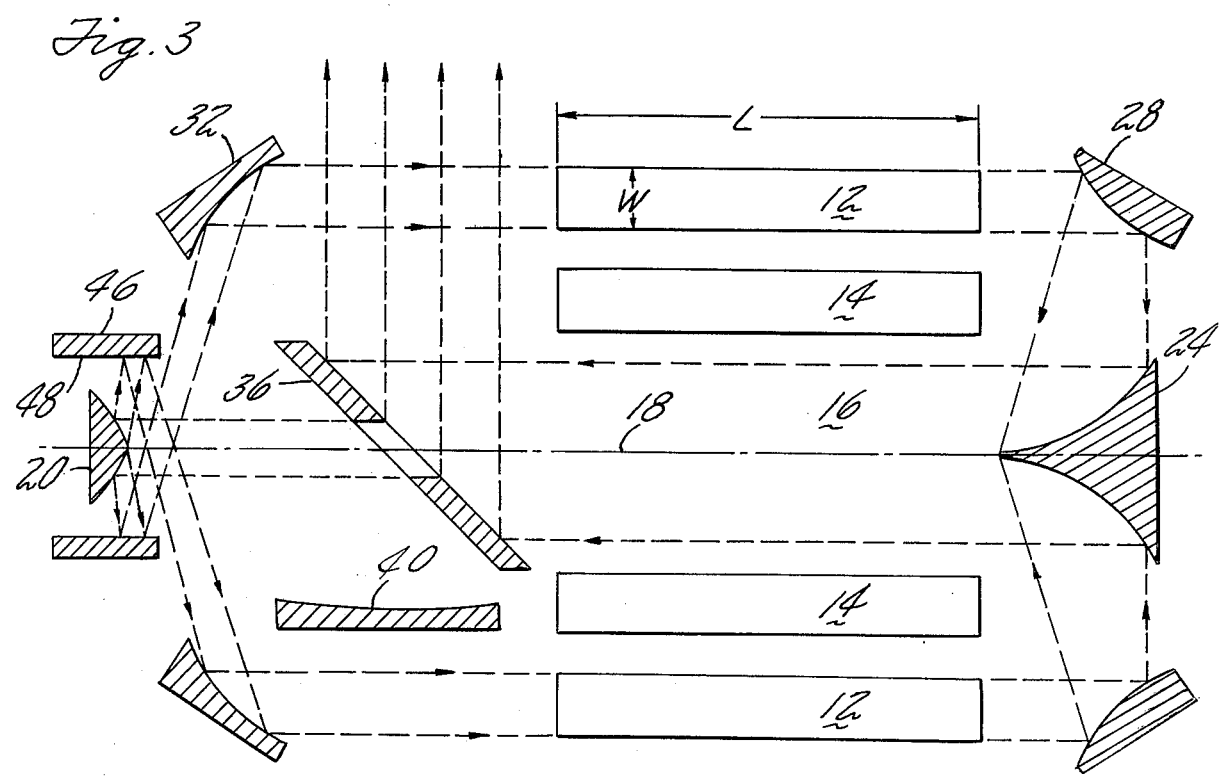
FIG. 3 is a simplified schematic of a cross-sectional view of an unstable ring resonator with a centerline crossover optical path.

An alternate resonator geometry is shown in FIG. 3. The optics are essentially the same as those in the resonator shown in FIG. 1 however a cylindrical folding mirror 46 having a cylindrical reflective surface 48 internal of the cylinder is positioned concentric about the first axial mirror 20. The cylindrical mirror causes the traveling wave pattern to cross over the centerline axis following a somewhat complicated ray trace as shown in FIG. 4 in contrast to the ray trace of FIG. 2. As a consequence of the ray trace shown in FIG. 4 the circulating power propagates through the diametrically opposite portions of the cylindrical gain region with each complete round trip through the resonator, thereby averaging out this influence of azimuthal variations within the gain medium which would otherwise tend to give rise to higher order azimuthal modes whose far field energy distribution departs from that associated with diffraction limited performance.

In order to avoid the astigmatic distortion which would result from off normal incidence using spherical surfaces, all the mirrors having convex or concave curvature have appropriate off axis parabolic surface contours. The cumulative effect of the curved surfaces 26, 30 allow the annular beam to be expanded so that the flux in the second axial mirror 24 in the center region is reduced thereby avoiding the shortcomings mentioned above. These curved surfaces maintain the beam collimated and increase with width of the annular beam in an amount $\Delta + W$ so that the diameter of the center region is $2(W + \Delta W)$ where $(1 + \Delta)$ is equal to the magnification of the two convex concave mirror pairs.

Alternate embodiments of the basic apparatus shown in FIGS. 1 and 3 are feasible. For example the mirror configurations can be altered to describe nonconfocal and negative branch resonators. Also a single set of the annular and conical mirrors having curved surfaces is sufficient for satisfactory operation of the ring.

Although this invention has been shown and described with respect to preferred embodiments thereof it should be understood by those skilled in the art that various changes and omissions in the form and detail thereof may be made therein without departing from the spirit and the scope of the invention.

Having thus described a typical embodiment of our invention that which we claim as new and desire to secure by Letters Patent of the United States is:

1. A radial flow laser system having an unstable ring resonator with a traveling wave optical path and including:
   a first axial mirror having a conical reflective surface which is positioned on and symmetrical about an axis forming the centerline of the resonator;
   a second axial mirror having a conical reflective surface which is positioned on and symmetrically about the centerline axis with the apex of the first axial mirror pointed toward the apex of the second axial mirror;
   a first annular mirror having a conical reflective surface and positioned symmetrically about the centerline axis with the apex end of the first annular mirror disposed oppositely with respect to the apex of the second axial mirror and with the reflective surfaces of the second axial and first annular mirrors being optically communicative with each other; and
   a second annular mirror having a conical reflective surface and positioned symmetrically about the centerline axis with the apex end of the second annular mirror disposed oppositely with respect to the apex of the first axial mirror and with the reflective surface of the second annular mirror being optically communicative with the reflective surfaces of both of the first axial and first annular mirrors whereby the first and second axial mirrors and the first and second annular mirrors form an unstable, traveling wave, ring resonator.

2. The invention of claim 1 including further a flat coupling mirror having a front reflective surface and a back reflective surface on the other side wherein the front surface is circular, the coupling mirror being positioned adjacent to the first axial mirror and symmetric about the centerline axis with the plane of the coupling mirror being inclined with respect to the centerline axis and the front reflective surface of the coupling mirror being optically communicative with the reflective surface of the second axial mirror.

3. The invention according to claim 2 including further a suppression mirror having a reflective surface and positioned adjacent to the coupling mirror with the reflective surface of the suppression mirror being optically communicative with the back flat reflective surface of the coupling mirror.

4. The invention according to claim 3 including further a third annular mirror having a cylindrical reflective surface positioned symmetrically about the centerline axis with the cylindrical reflective surface being optically communicative with the reflective surfaces of both the first axial and second annular mirrors.

5. The invention according to claim 1 wherein the reflective surface of the first axial mirror is curved convexly and the reflective surface of the second annular mirror is curved concavely.

6. The invention according to claim 1 wherein the reflective surface of the second axial mirror is curved concavely and the reflective surface of the first annular mirror is curved convexly.

7. The invention according to claim 1 including further means for providing a laser gain medium to a gain region between the first and second annular mirrors, the direction of flow of the gain medium being radially away from the centerline axis whereby the gain region assumes the configuration of a relatively thin wall cylinder which is symmetric about the centerline axis.

* * * * *

UNITED STATES PATENT OFFICE
CERTIFICATE OF CORRECTION

PATENT NO. : 3,969,688
DATED : July 13, 1976
INVENTOR(S) : ROBERT J. FREIBERG and GEORGE H. McLAFFERTY It is certified that error appears in the above-identified patent and that said Letters Patent are hereby corrected as shown below:

Column 1, line 34         delete "tha" and insert -- than --

Column 5, line 2          delete "lasting" and insert

-- lasing --

Column 6, line 29         delete "of", second occurrence

Signed and Sealed this

Thirtieth Day of November 1976

[SEAL]

Attest:

RUTH C. MASON
*Attesting Officer*

C. MARSHALL DANN
*Commissioner of Patents and Trademarks*